United States Patent
Li et al.

(10) Patent No.: US 8,060,804 B2
(45) Date of Patent: Nov. 15, 2011

(54) METHOD, SYSTEM, AND ACCESS DEVICE FOR IMPLEMENTING ERROR CORRECTION

(75) Inventors: Jun Li, Shenzhen (CN); Haijun Wu, Shenzhen (CN); Yue Chang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1131 days.

(21) Appl. No.: 11/837,428

(22) Filed: Aug. 10, 2007

(65) Prior Publication Data

US 2008/0040648 A1   Feb. 14, 2008

(30) Foreign Application Priority Data

Aug. 11, 2006   (CN) .......................... 2006 1 0112121

(51) Int. Cl.
*H03M 13/00*   (2006.01)

(52) U.S. Cl. ..................................................... 714/752

(58) Field of Classification Search .................. 714/746, 714/751–752, 776
See application file for complete search history.

(56) References Cited

U.S. PATENT DOCUMENTS

| 4,730,313 A | * | 3/1988 | Stephenson et al. | 714/708 |
| 5,553,140 A | * | 9/1996 | Kubota et al. | 380/210 |
| 2006/0072538 A1 | * | 4/2006 | Raith | 370/349 |

FOREIGN PATENT DOCUMENTS

CN   1409563 A   4/2003

* cited by examiner

*Primary Examiner* — Shelly A Chase (74) *Attorney, Agent, or Firm* — Conley Rose, P.C.; Grant Rodolph (57) ABSTRACT

A method, a system and an access device for implementing error correction are disclosed. The method includes upon receiving a data stream, identifying, by an access device, the data stream on which a forward error correction (FEC) needs to be performed and performing FEC coding on the data stream, and then sending out an FEC data stream generated by FEC coding together with a raw data stream, or sending out directly a data stream on which the FEC does not need to be performed. The system includes a data source for sending out a data stream and an access device for receiving the data stream from the data source, identifying the data stream on which a FEC needs to be performed, performing FEC coding on the data stream, and then sending out an FEC data stream generated by FEC coding together with a raw data stream, or sending out directly a data stream on which the FEC does not need to be performed. The bandwidth can be saved when the FEC is performed in data stream transmission, and it can be adapted to conditions of different access lines according to the invention.

16 Claims, 3 Drawing Sheets

METHOD, SYSTEM, AND ACCESS DEVICE FOR IMPLEMENTING ERROR CORRECTION

FIELD OF THE INVENTION

The present invention relates to the field of communication techniques, and in particular to a method, system and access device for implementing error correction.

BACKGROUND

At present it has become a business demand of more and more service providers to enable a Triple-Play network (data, voice and video). The video service is an important component of the Triple-Play network. The service providers wish to provide the video service over Digital Subscriber Line (DSL), Passive Optical Network (PON), or a wireless access such as Wireless LAN (WLAN) and a microwave access such as World Interoperability for Microwave Access (WiMAX).

Since the amount of information contained in video is large, it is almost impossible to transmit an uncompressed raw video stream via a network, which then leads to an introduction of a video coding technique. At present, the frequently used video coding techniques include MPEG2, H.264, VC-1, MPEG4, etc. An MPEG video stream includes three types of frames: I-frame, P-frame, and B-frame. Each frame is of different significance. The I-frame is a key frame of primary significance, the loss of which will make it impossible for the following P-frame and B-frame to be normally decoded, having severe influence on the video quality. The P-frame is a key frame of secondary significance, the loss of which will have influence on the decoding of the B-frame and the following P-frame, and often bring the visible distortion of video. The B-frame is a non-key frame, the loss of which will have influence only on itself and very limitedly on the video quality. When a relatively small number of B-frames are lost, the influence on the video may be negligible. It can be seen that the introduction of the video coding technique raises stricter requirements on the transmission quality of the video stream: as to the video on which the inter-frame compression is not performed, one packet lost may have influence on quality of merely one frame and the influence is limited; but as to the video stream on which the inter-frame compression is performed, a packet lost, if having influence on a key frame, may further have influence on the decoding of a plurality of the following frames and have severe influence on the video quality. Consequently, the video stream on which video coding is performed is highly sensitive to the packet lost, and a very low IP Packet Lost Rate (IPLR) must be maintained for the video service. Also, the Bit Error Ratio (BER) of a transmission line is closely related to the IPLR. A higher BER of the line will result in a higher IPLR, which may fail to meet the requirement of the video service on the IPLR.

In light of the above, a prior art solution is to only provide a video stream with a relatively low bandwidth, such as a video stream with lower quality, or to increase the compression ratio when the video stream is being compressed, based on the fact that the video stream with a lower bandwidth is relatively less sensitive to the IPLR than the video stream with a higher bandwidth. However, such a solution can not provide video programs of high quality, such as High-definition Digital Television (HDTV), and increasing the compression ratio usually needs to increase the interval of I-frames and thus results in increase in terminal decode delay, and may also enlarge the influence of one packet lost.

Another prior art solution is to provide the video service only on a DSL line with high quality and short distance, since the DSL line with high quality and short distance has a lower BER and a lower IPLR, and thus easily satisfying the requirements of the video service. However, this solution can not provide the video service for a wide range of subscribers and the video service can only serve subscribers of the DSL line with high quality and short distance, but not a great number of other subscribers.

As an improvement, there is a third solution in which a mechanism of end-to-end application layer Forward Error Correction (FEC) is employed in the video service. The so-called mechanism of application layer FEC lies in that FEC coding is employed at the application layer to add redundant error correction information. Thus, even if an error occurs in transmission that can not be corrected at the network layer, error correction may be performed at the receiving terminal through this application layer FEC coding redundancy information. In this solution, the video stream sent from a video source includes not only an ordinary video stream on which video coding has been performed, but also an FEC stream formed by an ordinary video stream through FEC coding. Thus a data stream with redundancy information can be provided for the receiving terminal, and the lost and damaged video stream may be recovered to some extent by means of the FEC. Specifically, this solution includes the following steps.

A1. At a video source, FEC coding is performed on a video stream on which video coding has been performed to generate an FEC stream.

For the same FEC coding, the greater the overhead of the FEC coding is, the better the error correction ability is. In other words, to reach the same target IPLR, the higher the IPLR without the FEC is, the greater the needed overhead of the FEC coding is.

A2. The raw video stream and the FEC stream is transmitted.

The transmitted raw video stream and the FEC stream are to be transmitted to a user terminal via a core network and an access network line, such as a DSL line.

A3. The user terminal receives the raw video stream and the FEC stream, and recovers the damaged data in the raw video stream according to the FEC data.

However, the above method has the following drawbacks.

1. The bandwidth of the network is wasted.

In general, the Quality of Service (QoS) of the core network can satisfy the requirements of the video service and the application layer FEC is not required. The FEC is only required in the access network. Thus such an end-to-end FEC actually wastes the bandwidth of the network.

2. The method can not be adapted to different access lines.

The conditions of access networks are different from one another. The BER of different access lines may differ greatly due to the quality, length and electromagnetic environment of the lines. There may be even a coexistence of different access techniques, such as the coexistence of DSL and WLAN. However, if an end-to-end method is used, the worst condition has to be considered to meet the requirements of all the lines. It is thus required that the video source employ the FEC with a maximum overhead. In fact, only a very small number of lines need the maximum overhead, and more lines just need less overhead. Many lines even do not need the application layer FEC at all, since these lines may meet the requirements by themselves. In other words, as to certain lines, this method wastes a large amount of bandwidth of the network and the line.

3. It is necessary for the video source to support the FEC function that most of the existing video sources do not support, resulting in limiting of the application of the video service.

4. Since the subscriber line is influenced by many external factors, its BER may vary within some range, which makes it difficult to determine how much the overhead of the FEC is needed to meet the requirements of all the subscribers.

SUMMARY OF THE INVENTION

Embodiments of the invention provide a method, system and access device for implementing error correction. The present invention can save bandwidth when error correction is performed in data stream transmission, and be adapted to conditions of different access lines.

The embodiments of the invention provide the following technical solutions.

The embodiments of the invention provide a method for implementing error correction including upon receiving a data stream, identifying, by an access device, the data stream on which FEC needs to be performed, performing FEC coding on the data stream, and then sending out an FEC data stream generated by the FEC coding together with a raw data stream, or sending out directly the data stream on which the FEC does not need to be performed.

Furthermore, the access device identifies the data stream on which FEC needs to be performed according to pre-configured rules.

Furthermore, the access device configures coding parameters according to requirements for data stream transmission to perform the FEC coding.

Furthermore, the access device configures transmission target parameters according to requirements for data stream transmission and determines the coding parameters in consideration of conditions of a user link to perform the FEC coding.

Furthermore, the access device performs the FEC coding separately according to conditions of each link or performs the FEC coding identically according to conditions of one link.

Correspondingly, embodiments of the invention provide a system for implementing error correction including a data source and an access device, wherein the data source is configured to send a data stream, and the access device is configured to receive the data stream sent by the data source, identify the data stream on which the FEC needs to be performed, perform FEC coding on the data stream, and then send out an FEC data stream generated by the FEC coding together with a raw data stream, or send out directly a data stream on which the FEC does not need to be performed.

Furthermore, the access device identifies the data stream on which the FEC needs to be performed according to pre-configured rules.

Furthermore, the access device configures coding parameters according to requirements for data stream transmission to perform the FEC coding, or configures transmission target parameters according to requirements for data stream transmission and determines the coding parameters in consideration of conditions of a user link to perform the FEC coding.

Furthermore, the access device performs the FEC coding separately according to conditions of each link or performs the FEC coding identically according to conditions of one link.

Embodiments of the invention further provide an access device for implementing error correction including a network side interface, an FEC processing module, and a user side interface, wherein the network side interface is configured to receive a data stream, the FEC processing module is configured to identify the data stream on which the FEC needs to be performed from the data stream received from the network side interface, perform the FEC coding on the data stream on which the FEC needs to be performed, package the FEC coded data, send out the packaged FEC data stream together with the raw data stream via the user side interface, or send out directly the data stream on which the FEC does not need to be performed via the user side interface, and the user side interface is configured to send out the data stream.

The access device further includes an FEC controlling module configured to issue a command to the FEC processing module to manage a process of FEC coding at the FEC processing module.

Furthermore, the access device identifies the data stream on which the FEC needs to be performed from the data stream received from the network side interface according to pre-configured rules.

The FEC processing module further includes a stream identifying module, an FEC coding module, and an FEC data packaging module, wherein the stream identifying module is configured to identify the data stream on which the FEC needs to be performed according to pre-configured rules, transfer the data stream on which the FEC needs to be performed to the FEC coding module, or directly send out a data stream on which the FEC does not need to be performed via the user side interface, the FEC coding module is configured to perform FEC coding on the data stream on which the FEC needs to be performed, and the FEC data packaging module is configured to package the FEC coded data generated by the FEC coding module and send out the packaged FEC data stream together with the raw data stream via the user side interface.

Furthermore, the FEC coding module configures the coding parameters according to requirements for data stream transmission to perform the FEC coding, or configures the transmission target parameters according to requirements for data stream transmission and determines the coding parameters in consideration of conditions of the user link to perform the FEC coding.

What can be seen from the above technical solution is as follows.

First, in the prior art solution hereinabove, FEC is performed at a data source such as a video source. The raw data stream with an FEC data stream are sent out from the data source and transmitted via a core network and then via an access network. The QoS of the core network can satisfy requirements for a video service, and the FEC is needed only at the access network, which thus wastes the bandwidth of the network. In the present invention, however, the FEC is performed directly at the access network. In other words, after receiving a data stream, the access device identifies the data stream on which the FEC needs to be performed according to pre-configured rules to perform FEC coding, and then sends out an FEC data stream generated by the FEC coding together with the raw data stream, or send out directly the data stream on which the FEC does not need to be performed. Thus the bandwidth of the network is greatly saved.

Second, the prior art solution hereinabove can not be adapted to different access lines, and the worst condition has to be considered for being adapted to all the lines. Thus it is required that a data source such as a video source performs the FEC with the maximum overhead. In the present invention, however, the FEC is performed directly at the access network, which may thereby be adapted to different access lines and achieve a high quality transmission of the data stream over an access link with lower quality.

Furthermore, in the prior art solution hereinabove, it is necessary for a data source such as a video source to support an FEC function that most of the prior art video sources do not support, which limits the application of the video service. The present invention is, however, to perform the FEC at an access device, and it's not required for the data source to support the FEC function, which thereby facilitates to the applications of the video, audio and other service.

Still furthermore, in the prior art solution hereinabove, it is difficult for a data source such as a video source to determine how much overhead for the FEC is needed to meet requirements for all subscribers. In the present invention, however, since the FEC is performed at the access network, it is possible for an access device to be aware of conditions of a user link and to easily determine how much overhead for the FEC is needed, and the coding parameters may be varied according to the variation of conditions of the user link so that the FEC coding is performed. Therefore, an optimal balance between transmission quality and bandwidth usage can be achieved.

DETAILED DESCRIPTION OF THE EMBODIMENTS

Embodiments of the present invention provide a method for implementing error correction, which is to perform a forward error correction (FEC) at an access device of an access network instead of performing that at a data source as before. In other words, after receiving a data stream, the access device identifies the data stream on which the FEC needs to be performed and performs FEC coding on the data stream, and then sends out an FEC data stream generated by the FEC coding together with a raw data stream, or sends out directly a data stream on which the FEC does not need to be performed. Thus, the problem of waste of bandwidth and other problems caused by the prior art solution that the FEC is performed at the data source can be solved.

An FEC module is added to the access device according to embodiments of the present invention. The FEC module may perform FEC coding on a specific stream, for example, a video stream or some portion of the video stream such as the key frames, and then send the raw data stream and the added FEC stream to a user via an access link.

It is to be appreciated that the present invention uses a video service as an example, but is not limited thereto and is also adapted to services provided by other different types of data source, such as an audio service, etc.

It is to be appreciated that the FEC mentioned in this specification refers to a general FEC and does not refer to an FEC in relation to a specific link layer, such as an R-S coding of a DSL.

The present invention will be described in detail below with reference to the drawings and the embodiments thereof for the purpose of better understanding of the present invention.

Figure 1:
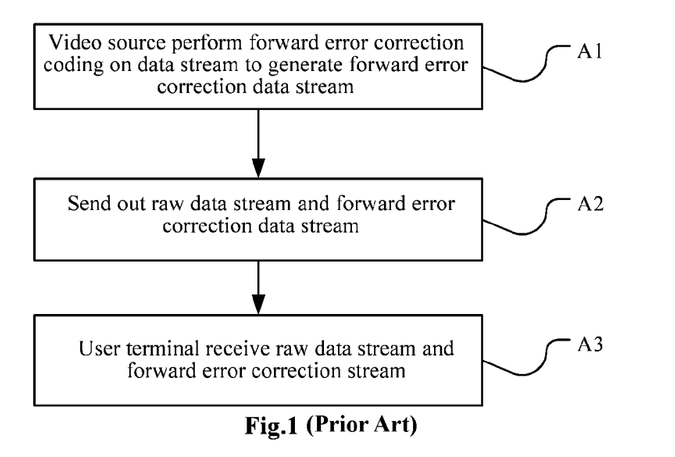
FIG. 1 is a flow diagram illustrating a method according to the prior art.
Figure 2:
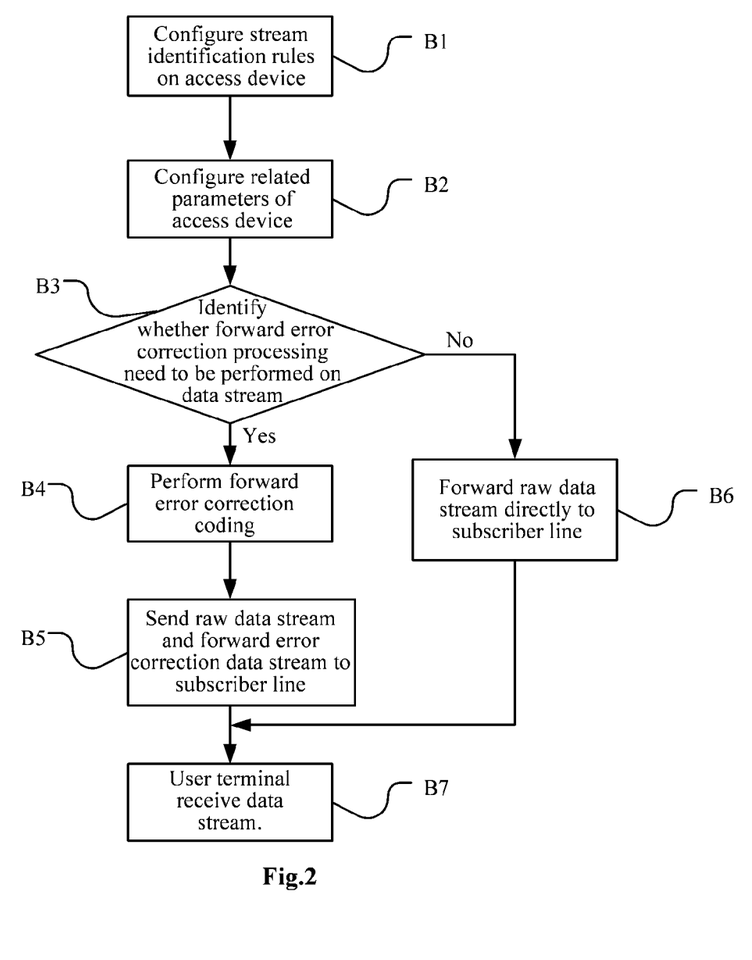
FIG. 2 is a flow diagram illustrating a method according to a first embodiment of the present invention.

Referring to FIG. 2, a flow diagram of a method according a first embodiment of the present invention is illustrated, which includes the following steps.

B1. An access device configures stream identification rules, specifying that an FEC is performed on certain specific streams.

These stream identification rules may be general stream rules in the art, which include identification of a stream according to the virtual LAN (VLAN), the source/destination Media Access Control (MAC) address, the Ether-Type, the source/destination IP address, the IP protocol, the Transmission Control Protocol (TCP)/User Data Package Protocol (UDP) port number, the 802.1P priority, the Type of Service (ToS)/Differentiated Services Code Point (DSCP), etc. of packets, and identification of the stream through Deep Packet Inspection (DPI) to the packets, for example, identification of the stream through the Picture-Type of RFC2250 or priority flag in NALU of H.264 NAL layer.

It is to be appreciated that the stream rules are not limited to any specific one herein. The only purpose of configuring the stream rules is to identify the data stream on which the FEC needs to be performed.

B2. The access device configures FEC coding parameters according to such factors as actual conditions of an access link, requirements for stream transmission quality, bandwidth of the stream, etc.

Performing the FEC inevitably causes extra overhead, which should be made as little as possible to achieve required coding effect. Different FEC algorithms have different coding parameters and are not limited to certain FEC algorithm herein. Moreover, the definitions of the parameters for different coding algorithms are different. For a specific algorithm, these parameters determine a coding ratio, in other words, determine how much overhead is needed for the coding. Usually, within certain scope, the greater the overhead is, the better the error correction ability is. Although the FEC algorithms are not limited to any specific type, different FEC algorithms are common in one point that within certain scope, in order to reach the same target bit error ratio (BER), the higher an original BER is, the greater the required overhead of the coding is.

In light of the above, according to conditions of the BER of the line and requirements for the target BER, the FEC coding parameters that reach the target of error correction and have minimum overhead can be found. Coding with greater overhead is selected through parameter configuration if the BER of the line is much higher than the target BER, or coding with less overhead is selected. The BER is closely related to an IPLR in that the higher the BER of the line is, the higher the IPLR will be. Methods for determining the parameters vary dependent on different FEC algorithms and different technical selections, e.g., calculating with formulas or looking for empiric values. The formulas for different FEC algorithms are different. As to the method of looking for the empiric values in a table, the frequently used empiric values are stored in the table, thereby looking up the table for the coding parameters. For example, listed in the empiric table may be parameters which are needed for the IPLR of all kinds of typical lines to acquire all kinds of target IPLR, thereby the parameters are acquired by looking up the table instead of calculating. This is done because that, first, calculation may be complex for some algorithms; second, theoretical values may not be capable of reflecting the practical situation so well as the actual empiric values do; and third, in some cases, rough values are also acceptable and accurate calculation are unnecessary.

Descriptions are made below of how to determine the FEC coding parameters using RFC2733 as an example.

RFC2733 defines a mechanism of a general FEC of Real-time Transfer Protocol (RTP), with which considerable video quality improvement may be acquired with less overhead and time delay.

RFC2733 defines that an FEC packet is generated by performing a simple XOR operation on the payload of several RTP packets. The FEC packets are carried by an independent RTP stream while the data source is sending out the original packets with a RTP stream. Thus when one of n original packets, from which the FEC packet is generated, is lost, the lost packet may be recovered by other original packets and the FEC packet. It is defined in the protocol that every 24 consecutive original packets are used as one block for generating one or more FEC packets.

L×D=24; $1 \leq L \leq 24$; $1 \leq D \leq 24$. L and D denote the numbers of the original packets.

The overhead of the FEC is shown below:

| XOR(L, D) | Overhead |
|---|---|
| XOR(1, 24) | 4.2% |
| XOR(2, 12) | 8.3% |
| XOR(3, 8) | 12.5% |
| XOR(4, 6) | 16.7% |
| XOR(6, 4) | 25% |
| XOR(8, 3) | 33.3% |
| XOR(12, 2) | 50% |
| XOR(24, 1) | 100% |

For a link whose original IPLR is $E_0$, if the above FEC is added, one FEC packet is calculated to be inserted for every D packets. The IPLR after the FEC has been performed becomes $E_D$:

$$E_D = E_0 \times [1-(1-E_0)^D]$$

According to the above analysis to the DSL lines, $E_0$=3E-5, the IPLR acquired by considering the FEC overhead of 4.2%-25% respectively is reduced.

| XOR(L, D) | Overhead | D | $E_0$(IPLR) | $E_D$(IPLR) |
|---|---|---|---|---|
| XOR(1, 24) | 4.2% | 24 | 3E-5 | 2E-8 |
| XOR(2, 12) | 8.3% | 12 | | 1E-8 |
| XOR(3, 8) | 12.5% | 8 | | 7E-9 |
| XOR(4, 6) | 16.7% | 6 | | 5E-9 |
| XOR(6, 4) | 25% | 4 | | 3.6E-9 |

It can be seen from this example that lines having the same IPLR of 3E-5 but different target IPLR need different coding parameters to be configured.

B3. The access device identifies whether the FEC process needs to be performed on the data stream.

The access device receives the data stream from the network and identifies the stream on which the FEC process needs to be performed according to the stream rules preconfigured in step B1. If it is a stream on which the FEC does not need to be performed, the stream is directly forwarded to the subscriber line, i.e., it proceeds to step B6. If it is a stream on which the FEC needs to be performed, then it proceeds to step B4.

B4. The access device performs FEC coding on the identified data stream on which the FEC needs to be performed with the predetermined FEC algorithm and the determined FEC coding parameters of the access device to generate the redundant FEC data.

It is to be appreciated that a particular approach of performing FEC coding may include coding with a fixed FEC algorithm and only adjusting the FEC parameters, but the present invention is not limited thereto. When several FEC coding algorithms are available, different coding algorithms and/or coding parameters may be selected dynamically. For example, it is possible to select different FEC algorithms according to different requirements to the error correction ability. For example, if algorithm A has better error correction ability but higher calculation complexity than algorithm B, then algorithm B is used in normal conditions while algorithm A is used in such conditions that a link has particularly poor quality.

B5. The access device sends the raw data stream and the FEC stream generated from the raw data stream to the subscriber line, and proceed to step B7.

B6. The access device forwards the raw data stream, i.e., the stream on which the FEC does not need to be performed to the subscriber line, and proceed to step B7.

B7. The user terminal receives the data stream.

The user terminal may receive the raw data stream and the FEC stream, or may receive only the raw stream. If the user terminal receives the raw data stream and the FEC stream together, the user terminal may use the redundant FEC stream to recover the data stream to some extent with the FEC algorithm when loss or damage occurs to the raw data stream.

The steps of the method according to the embodiment of the present invention are described above, and these steps may be modified in practical use to improve flexibility. Since the user link is between the user terminal and the access device, and the access device is aware of the quality of the user link to handle more accurately the link parameters, the access device can dynamically adjust the FEC coding parameters according to the user link quality, thereby achieving an optimal balance between bandwidth usage and transmission quality.

Figure 3:
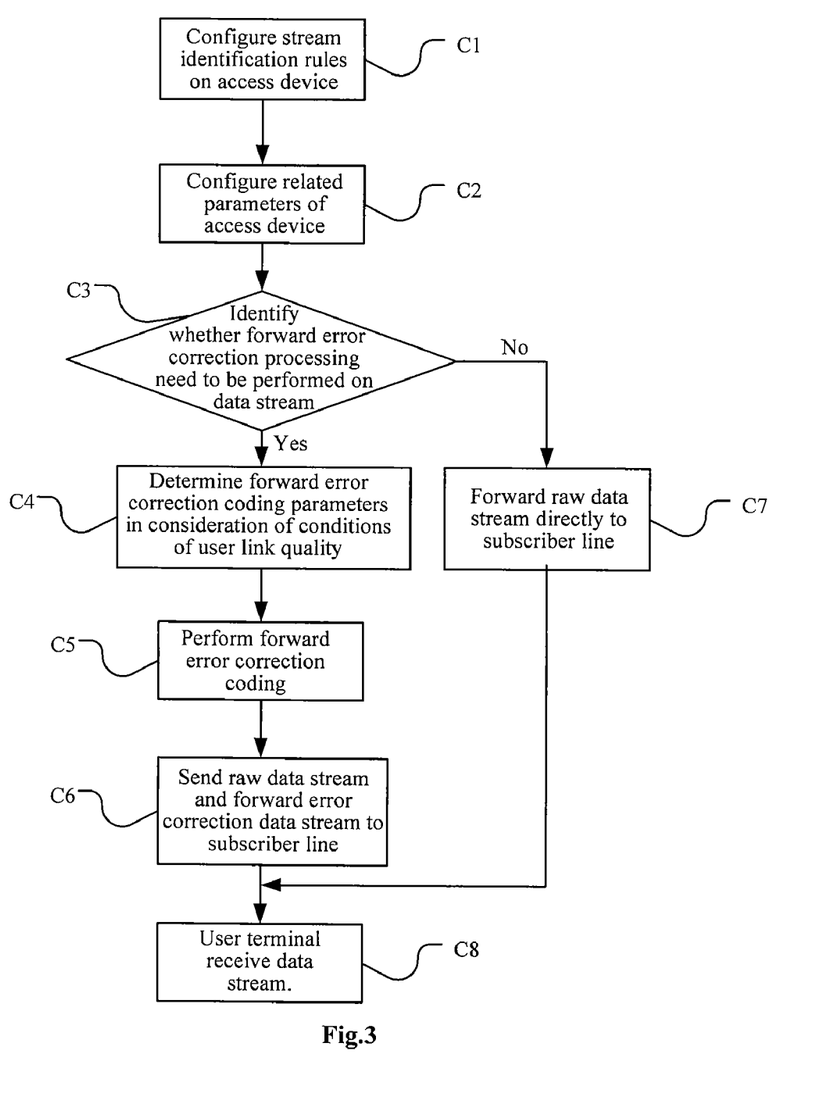
FIG. 3 is a flow diagram illustrating a method according to a second embodiment of the present invention.

Referring to FIG. 3, a flow diagram of a method according to a second embodiment of the present invention is illustrated. The second embodiment differs from the first embodiment mainly in that the first embodiment directly configures the FEC parameters to the access device whereas the second embodiment configures only the FEC target to the access device. The parameters used for achieving the target are calculated and determined by the access device according to particular conditions of the lines. This embodiment includes the following steps.

C1. An access device configures stream identification rules, specifying that an FEC is performed on certain specific streams.

These stream identification rules may be general stream rules in the art, which include identification of a stream according to the virtual LAN (VLAN), the source/destination Media Access Control (MAC) address, the Ether-Type, the source/destination IP address, the IP protocol, the Transmission Control Protocol (TCP)/User Data Package Protocol (UDP) port number, the 802.1P priority, the Type of Service (ToS)/Differentiated Services Code Point (DSCP), etc. of packets, and identification of the stream through the deep packet inspection (DPI) to the packets, for example, identification of the stream through the Picture-Type of RFC2250 or the priority flag in NALU of H.264 NAL layer.

It is to be appreciated that the stream rules are not limited to any specific ones herein. The only purpose of configuring the stream rules is to identify the data stream on which the FEC needs to be performed.

C2. The access device configures FEC-related parameters according to such factors as actual conditions of an access link, requirements to stream transmission quality, the bandwidth of the stream, etc.

For example, it is possible to configure a target IPLR of the FEC, or a target "average irrecoverable error interval" of the FEC, etc.

C3. The access device identifies whether the FEC process needs to be performed on the data stream.

The access device receives the data stream from the network and identifies the stream on which the FEC process needs to be performed according to the stream rules pre-configured in step C1. If it is a stream on which the FEC does not need to be performed, then the stream is directly forwarded to the subscriber line, i.e., proceed to step C7. If it is a stream on which the FEC needs to be performed, then proceed to step C4.

C4. The access device calculates and determines the FEC coding parameters according to such factors as requirements for transmission quality of the stream and bandwidth of the stream in consideration of conditions of the user link quality.

If what is configured is the target IPLR, the FEC coding parameters may be determined according to the target IPLR and the actual IPLR of the user link. If what is configured is the "average irrecoverable error interval", the target IPLR may be acquired firstly by the calculation of the "average irrecoverable error interval" and the bandwidth of the stream, and then the FEC coding parameters are determined according to the target IPLR and the actual IPLR of the user link. These FEC coding parameters are not fixed but may vary dependent on the variation of conditions of the user link quality, i.e., these FEC coding parameters may be dynamically adjusted, thereby achieving an optimal balance between bandwidth usage and transmission quality of the data stream.

C5. The access device performs FEC coding on the identified data stream on which the FEC needs to be performed with the predetermined FEC algorithm and the FEC coding parameters calculated in the previous step to generate the redundant FEC data.

It is to be appreciated that a particular approach of performing FEC coding may include coding with a fixed FEC algorithm and only adjusting the FEC parameters, but the present invention is not limited thereto. When several FEC coding algorithms are available, different coding algorithms and/or coding parameters may be selected dynamically. For example, it is possible to select different FEC algorithms for different requirements to the FEC error correction ability. For example, if algorithm A has better error correction ability but higher calculation complexity than algorithm B, then algorithm B is used in normal conditions while algorithm A is used in such conditions that a link has particularly poor quality.

C6. The access device sends the raw data stream and the FEC stream generated from the raw data stream to the subscriber line, and proceed to step C8.

C7. The access device forwards the raw data stream, i.e., the stream on which the FEC does not need to be performed, to the subscriber line, and proceed to step C8.

C8. The user terminal receives the data stream.

The user terminal may receive the raw stream and the FEC stream, or may receive only the raw stream. If the user terminal receives the raw stream and the FEC stream together, the user terminal may use the redundant FEC stream to recover the data stream to some extent with the FEC algorithm when loss or damage occurs to the raw stream.

It is to be appreciated that the data stream may be a unicast stream or a multicast stream. For each unicast stream, each stream is received by only one user and FEC coding parameters may be determined according to conditions of this specific user link quality. For each multicast stream, one same stream may be received by a plurality of subscribers, and there are two possible approaches to deal with it: A. Generate independent FEC coding parameters according to conditions of each user link and perform FEC coding separately; B. Generate identical FEC coding parameters according to conditions of the user link which has the worst link quality and perform FEC coding identically.

Described above are the steps of the methods according to embodiments of the present invention. Correspondingly, embodiments of the present invention provide a system for implementing error correction.

Figure 4:
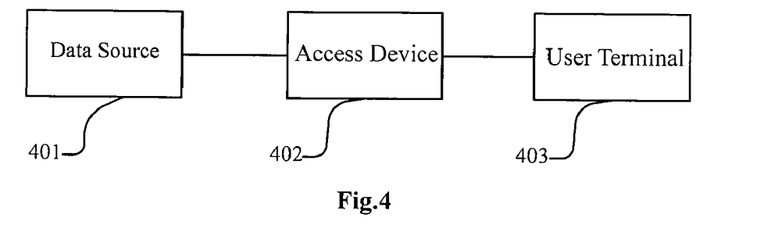
FIG. 4 is a diagram showing a system according to the invention.

Referring to FIG. 4, a diagram of a system according to an embodiment of the present invention is shown.

The system includes a data source 401 and an access device 402. The data source 401 is configured to send out a data stream, and the access device 402 is configured to receive the data stream sent out from the data source 401, identify the data stream on which the FEC needs to be performed according to pre-configured rules and perform FEC coding on the data stream, and send out an FEC data stream generated by the FEC coding together with the raw data stream, or send out directly a data stream on which the FEC does not need to be performed.

The access device 402 may configure coding parameters according to requirements for data stream transmission to perform FEC coding, or configure transmission target parameters according to the requirements for data stream transmission and determine the coding parameters in consideration of conditions of a user link to perform FEC coding.

In addition, the access device 402 may perform the FEC coding separately according to conditions of each link or perform the FEC coding identically according to conditions of one link.

The system further includes a user terminal 403 for receiving the data stream transmitted from the access device 402 and recovering data when data loss or damage occurs to the raw data stream by performing the FEC on the data stream.

Figure 5:
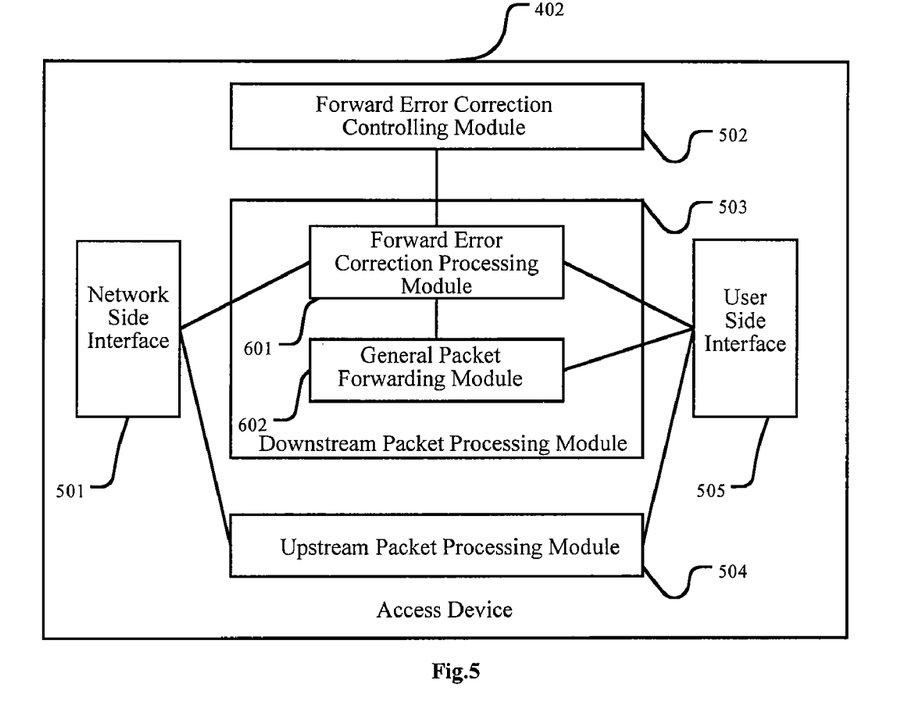
FIG. 5 is a diagram showing the structure of an access device according to the invention.
Figure 6:
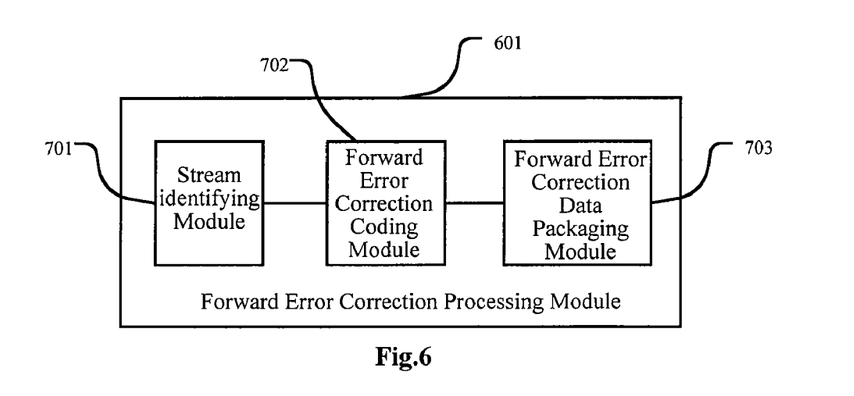
FIG. 6 is a diagram showing the structure of an FEC processing module in an access device according to the invention.

Referring now to FIG. 5 and FIG. 6, a diagram of the structure of an access device and a diagram of the structure of an FEC processing module in the access device according to the present invention are shown, respectively.

The access device 402 includes a network side interface 501, an FEC controlling module 502, a downstream packet processing module 503, an upstream packet processing module 504, and a user side interface 505. The downstream packet processing module 503 includes an FEC processing module 601 and a general packet forwarding module 602, wherein the FEC processing module 601 further includes a stream identifying module 701, an FEC coding module 702 and an FEC data packaging module 703.

The network side interface 501 is used for receiving the data stream transmitted from the data source 401. The FEC controlling module 502 is used for managing a process of the FEC at the FEC processing module 601. The FEC processing module 601 in the downstream packet processing module 503 is used for identifying the data stream on which the FEC needs to be performed according to pre-configured rules, performing FEC coding on the data stream on which the FEC needs to be performed, packaging the data on which the FEC coding is performed, sending out the packaged FEC data stream together with the raw data stream via the user side interface 505, and forwarding the data stream on which the FEC coding does not need to be performed to the general packet forwarding module 602 for processing. The general packet forwarding module 602 in the downstream packet processing module 503 is used for directly forwarding the data stream on which the FEC does not need to be performed via the user side interface 505. The upstream packet processing module 504 is primarily used for processing an upstream data stream. The data stream transmitted from the user terminal 403 is received by the user side interface 505, and forwarded to the network side interface 501 via the upstream packet processing module 504 before being sent out. The user side interface 505 is used for transmitting the data stream to the user terminal 403.

Each of the network devices may be divided into a controlling plane and a forwarding plane, wherein the forwarding plane is to perform forwarding of the data stream and the controlling plane is to perform controlling of the forwarding plane. In the access device 402 according to the present invention, the FEC controlling module 502 belongs to the controlling plane of the access device 402, while other modules belong to the forwarding plane of the access device 402.

The system according to the present invention is different from the prior art system in that the FEC controlling module 502 is added to the controlling plane, and the FEC processing module 601 is added to the downstream packet processing module 503 during the downstream processing of the forwarding plane. The FEC controlling module 502 issues command to the FEC processing module 601 to control the coding parameters and algorithm of the FEC processing module 601. The FEC processing module 601 determines how to perform coding particularly, e.g., determines the coding parameters and the coding algorithm according to the issued command.

With respect to the stream identifying module 701, the FEC coding module 702, and the FEC data packaging module 703 included in the FEC processing module 601, first, the stream identifying module 701 identifies the stream on which the FEC coding needs to be performed according to pre-configured rules, forwards the stream on which the FEC coding needs to be performed to the FEC coding module 702, and forwards the stream on which the FEC coding does not need to be performed to the general packet forwarding module 602 for processing, and then, the FEC coding module 702 performs FEC coding on the stream on which the FEC coding needs to be performed. Finally, the FEC data packaging module 703 completes packaging of the data on which the FEC is performed, generates the FEC stream, and transmits the FEC stream together with the raw stream of the general packet forwarding module 602 to the user side interface 505, and then to the user terminal 403 via the user side interface 505.

The FEC coding module 702 may configure the coding parameters according to requirements for data stream transmission to perform FEC coding, or configure the transmission target parameters according to requirements for data stream transmission and determine the coding parameters in consideration of conditions of the user link to perform FEC coding.

A method, system and access device for implementing error correction provided by embodiments of the present invention have been described in detail above. Specific examples are employed in this specification to explain the principle and embodiments of the present invention. The above description of the embodiments is only to help understanding the method according to the present invention and the spirit thereof, and it is possible for those skilled in the art to make modifications to the embodiments and scope of the applications in accordance with the idea of the present invention. In conclusion, the disclosure of the description should not be interpreted as limiting of the present invention.

What is claimed is:

1. A method for implementing error correction, comprising: upon receiving a data stream, identifying, by an access device, the data stream on which forward error correction needs to be performed, performing forward error correction coding on the data stream, and then sending out a forward error correction data stream generated by the forward error correction coding together with a raw data stream, or sending out directly a data stream on which the forward error correction does not need to be performed.

2. The method for implementing error correction according to claim 1, further comprising: identifying the data stream on which forward error correction needs to be performed according to pre-configured rules.

3. The method for implementing error correction according to claim 1, further comprising: configuring coding parameters according to requirements for data stream transmission to perform the forward error correction coding.

4. The method for implementing error correction according to claim 1, further comprising: configuring transmission target parameters according to requirements for data stream transmission and determining coding parameters in consideration of conditions of a user link to perform the forward error correction coding.

5. The method for implementing error correction according to claim 3, further comprising: performing the forward error correction coding separately according to conditions of each link or performing the forward error correction coding identically according to conditions of one link.

6. The method for implementing error correction according to claim 4, further comprising: performing the forward error correction coding separately according to conditions of each link or performing the forward error correction coding identically according to conditions of one link.

7. A system for implementing error correction, comprising: a data source and an access device; wherein the data source is configured to send out a data stream; and the access device is configured to receive the data stream sent out by the data source, identify the data stream on which forward error correction needs to be performed, perform forward error correction coding on the data stream, and then send out a forward error correction data stream generated by the forward error correction coding together with a raw data stream, or send out directly a data stream on which the forward error correction does not need to be performed.

8. The system for implementing error correction according to claim 7, wherein: the access device identifies the data stream on which forward error correction needs to be performed according to pre-configured rules.

9. The system for implementing error correction according to claim 7, wherein: the access device configures coding parameters according to requirements for data stream transmission to perform the forward error correction coding, or configures transmission target parameters according to requirements for data stream transmission and determines the coding parameters in consideration of conditions of a user link to perform the forward error correction coding.

10. The system for implementing error correction according to claim 7, wherein: the access device performs the forward error correction coding separately according to conditions of each link or performs the forward error correction coding identically according to conditions of one link.

11. The system for implementing error correction according to claim 9, wherein: the access device performs the forward error correction coding separately according to conditions of each link or performs the forward error correction coding identically according to conditions of one link.

12. An access device for implementing error correction, comprising: a network side interface, a forward error correction processing module, and a user side interface; wherein the network side interface is configured to receive a data stream; the forward error correction processing module is configured to identify the data stream on which forward error correction needs to be performed from the data stream received from the network side interface, perform the forward error correction coding on the data stream, package the forward error correction coded data, and send out the packaged forward error correction data stream together with a raw data stream via the user side interface, or send out directly a data stream on which the forward error correction does not need to be performed via the user side interface; and the user side interface is configured to send out the data stream.

13. The access device for implementing error correction according to claim 12, further comprising: a forward error correction controlling module configured to issue a command to the forward error correction processing module to manage a process of forward error correction coding at the forward error correction processing module.

14. The access device for implementing error correction according to claim 12, wherein: the forward error correction processing module identifies the data stream on which forward error correction needs to be performed from the data stream received from the network side interface according to pre-configured rules.

15. The access device for implementing error correction according to claim 12, wherein: the forward error correction processing module further comprises a stream identifying module, a forward error correction coding module and a forward error correction data packaging module; wherein the stream identifying module is configured to identify the data stream on which the forward error correction needs to be performed according to pre-configured rules, and transfer the data stream to the forward error correction coding module, or send out directly a data stream on which the forward error correction does not need to be performed via the user side interface; the forward error correction coding module is configured to perform the forward error correction coding on the data stream on which the forward error correction needs to be performed; and the forward error correction data packaging module is configured to package the data on which the forward error correction coding has been performed by the forward error correction coding module and send out the packaged forward error correction data stream together with the raw data stream via the user side interface.

16. The access device for implementing error correction according to claim 15, wherein: the forward error correction coding module configures coding parameters according to requirements for data stream transmission to perform the forward error correction coding, or configures transmission target parameters according to requirements for data stream transmission and determines the coding parameters in consideration of conditions of a user link to perform the forward error correction coding.

* * * * *